| (12) | United States Patent | (10) Patent No.: US 10,845,688 B2 |
|---|---|---|
| | Hino et al. | (45) Date of Patent: Nov. 24, 2020 |

(54) ACTUATOR, OPTICAL DEVICE, AND PROJECTOR

(71) Applicant: SEIKO EPSON CORPORATION, Tokyo (JP)

(72) Inventors: Makiko Hino, Matsumoto (JP); Yasushi Mizoguchi, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 95 days.

(21) Appl. No.: 16/173,036

(22) Filed: Oct. 29, 2018

(65) Prior Publication Data

US 2019/0129292 A1 May 2, 2019

(30) Foreign Application Priority Data

Oct. 30, 2017 (JP) .................. 2017-208894

(51) Int. Cl.
| G03B 21/43 | (2006.01) |
| G02B 27/09 | (2006.01) |
| G02B 5/02 | (2006.01) |
| G02B 27/48 | (2006.01) |
| G02B 26/08 | (2006.01) |
| G02B 13/16 | (2006.01) |
| G02B 27/14 | (2006.01) |
| G03B 21/20 | (2006.01) |

(52) U.S. Cl.
CPC ....... G03B 21/2033 (2013.01); G02B 5/0205 (2013.01); G02B 13/16 (2013.01); G02B 26/085 (2013.01); G02B 27/0977 (2013.01); G02B 27/48 (2013.01); G03B 21/43 (2013.01); *G02B 27/149* (2013.01)

(58) Field of Classification Search
CPC .. G03B 21/2033; G03B 21/43; G03B 21/208; G02B 13/16; G02B 26/085; G02B 27/48; G02B 5/0205; G02B 27/0977; G02B 27/149; G02B 27/646; H01L 41/096; H01L 41/0953; H02N 2/028
See application file for complete search history.

(56) References Cited

U.S. PATENT DOCUMENTS

| 6,713,943 | B1 * | 3/2004 | Matsuda | .............. | H02N 2/0025 |
| | | | | | 310/317 |
| 2007/0024715 | A1 * | 2/2007 | Hirasawa | .............. | G02B 27/646 |
| | | | | | 348/208.7 |
| 2007/0251916 | A1 * | 11/2007 | Akahane | .............. | G02B 5/0242 |
| | | | | | 216/27 |
| 2009/0091666 | A1 | 4/2009 | Kurozuka et al. | | |
| 2012/0044557 | A1 | 2/2012 | Isobe | | |

FOREIGN PATENT DOCUMENTS

| JP | 2000-358387 A | 12/2000 |
| JP | 2009-229597 A | 10/2009 |
| JP | 2012-042742 A | 3/2012 |
| WO | 2007/105678 A1 | 9/2007 |

* cited by examiner

*Primary Examiner* — Michelle M Iacoletti
*Assistant Examiner* — Danell L Owens
(74) *Attorney, Agent, or Firm* — Oliff PLC

(57) ABSTRACT

Movement of a movable portion without stopping at any moment can be achieved by a simple configuration including a beam structural portion including two beam portions extending in directions different from each other and one driving portion. Furthermore, a size reduction of a device is achieved in comparison with a case where a device includes a motor disposed for rotation driving.

15 Claims, 8 Drawing Sheets

ACTUATOR, OPTICAL DEVICE, AND PROJECTOR

BACKGROUND

1. Technical Field

The disclosure relates to an actuator, an optical device, and a projector.

2. Related Art

A projector using a laser light source is known, and in the projector, an optical device including a prism array and the like to suppress occurrence of a speckle is disposed to be vibrated by linear motion in a vertical plane orthogonal to an optical path (see JP-A-2012-042742).

Furthermore, a truss-type actuator provided with two piezoelectric elements orthogonal to each other and having a substantially identical natural frequency, and further provided with a chip member at an intersection of the piezoelectric elements is known, and in the truss-type actuator, the two piezoelectric elements are separately driven (see JP-A-2000-358387).

However, in JP-A-2012-042742, owing to the linear motion, there is a moment when the optical device stops moving to turn back, and thus a speckle may occur at such a moment. Furthermore, in JP-A-2000-358387, complicated movement can be achieved, but a structure also becomes complicated. Thus, for example, a size reduction and the like are difficult.

SUMMARY

An advantage of some aspects of the embodiment is that an actuator is provided capable of achieving suitable movement that, for example, can suppress the occurrence of a speckle as described above, in an optical device with a simple configuration and a reduced size, the optical device including the actuator, and a projector.

An actuator according to an aspect of the embodiment includes a movable portion, a beam structural portion including a first beam portion coupled to the movable portion and a second beam portion coupled to the first beam portion and extending in a direction different from a direction of the first beam portion, and a driving portion including one driving mechanism and configured to excite the movable portion in two vibration directions defined based on the beam structural portion to cause the movable portion to undergo curvilinear motion maintaining movement in at least one of the two vibration directions.

In the above-described actuator, movement of the movable portion without stopping at any moment can be achieved by a simple configuration including the beam structural portion including the two beam portions extending in the directions different from each other and the one driving portion. Furthermore, a size reduction of a device can be achieved in comparison with a case where a device includes a motor disposed for rotation driving, for example.

According to a specific aspect of the embodiment, in the above-described actuator, two resonant modes corresponding to the two vibration directions are provided. In this case, the actuator can cause the movable portion to undergo suitable curvilinear motion according to characteristics of the two resonant modes.

According to another aspect of the embodiment, the driving portion operates at a driving frequency corresponding to the two resonant modes and causes the movable portion to resonate and vibrate. In this case, driving with high efficiency by resonance and vibration can be achieved.

According to still another aspect of the embodiment, the driving frequency includes a frequency within the range in which gains of resonant frequencies corresponding to the two resonant modes overlap each other. In this case, appropriate driving can be ensured.

According to still another aspect of the embodiment, the two resonant modes are defined by the movable portion, the beam structural portion, and a beam portion side-driving element incorporated in the driving portion and attached to the beam structural portion. In this case, the resonant frequencies in the two resonant modes can be made substantially identical by the configuration such as the beam structural portion.

According to still another aspect of the embodiment, the two resonant modes are different from a resonant mode in an out-of-plane direction vertical to an in-plane direction of a plane parallel with directions in which the first and second beam portions extend. In this case, vibration in the out-of-plane direction can be suppressed.

According to still another aspect of the embodiment, the beam structural portion includes a plurality of the first beam portions extending in directions different from one another and a plurality of the second beam portions provided corresponding to the plurality of first beam portions, respectively. In this case, the plurality of first beam portions cooperate with the plurality of second beam portions. Thus, complex vibration generating curvilinear motion (for example, motion such as circle motion) maintaining movement in at least one of the two vibration directions can be generated.

According to still another aspect of the embodiment, the beam structural portion includes four first beam portions extending in directions different from one another by 90° in the same plane and four second beam portions provided corresponding to the four first beam portions, respectively. In this case, suitable curvilinear motion can be generated stably in the same plane.

According to still another aspect of the embodiment, the plurality of first beam portions are disposed at positions displaced from a central position in the beam structural portion. In this case, suitable curvilinear motion can start reliably.

According to still another aspect of the embodiment, the first beam portion constitutes an inner beam extending in a first direction and including the movable portion mounted at the center, and the second beam portion constitutes a pair of outer beams provided at both ends of the first beam portion and extending in a second direction. In this case, the first beam portion constituting the inner beam directly vibrates the movable portion, whereas the second beam portion vibrates the first beam portion on which the movable portion is mounted. Thus, complex vibration generating curvilinear motion (for example, motion such as circle motion) maintaining movement in at least one of the two vibration directions can be generated.

According to still another aspect of the embodiment, the first beam portion vibrates in one of the two vibration directions, and the second beam portion vibrates in the other of the two vibration directions. In this case, suitable curvilinear motion can be generated by combining vibration in the one of the vibration directions by the first beam portion and vibration in the other of the vibration directions by the second beam portion.

According to still another aspect of the embodiment, the first beam portion constituting the inner beam includes a hole. In this case, the first beam portion is provided with the hole to change a spring constant of the first beam portion, and thus a resonant frequency in a vibration direction can be adjusted.

According to still another aspect of the embodiment, the actuator further includes a vibration separating portion provided at a coupling place where the first beam portion intersects the second beam portion and configured to separate vibration. In this case, vibration is separated in the two vibration directions with the vibration separating portion as a reference.

An optical device according to an aspect of the embodiment includes the actuator according to any of the above-described aspects, and an optical element provided in the movable portion and configured to undergo the curvilinear motion.

The above-described optical device includes the above-described actuator, and thus movement of the movable portion without stopping at any moment can be achieved. Furthermore, a size reduction of a device can be achieved in comparison with a case where a device includes a motor disposed for rotation driving, for example.

According to a specific aspect of the embodiment, the optical element includes a light diffusion plate. In this case, the light diffusion plate is caused to undergo the curvilinear motion as described above, and thus, for example, a speckle of laser light reflected by the light diffusion plate can be reduced.

A projector according to an aspect of the embodiment includes the optical device according to any of the above-described aspects, and the projector is configured to perform image projection with laser light reflected by the optical device. In this case, excellent image display in which a speckle due to laser light is reduced can be performed.

The above-described projector includes the above-described optical device, namely, the above-described actuator, and can thus perform excellent image display in which a speckle due to laser light is reduced, for example.

BRIEF DESCRIPTION OF THE DRAWINGS

The embodiment will be described with reference to the accompanying drawings, wherein like numbers reference like elements.

DESCRIPTION OF EXEMPLARY EMBODIMENTS

First Exemplary Embodiment

Hereinafter, an example of an actuator according to First Exemplary Embodiment will be described in detail with reference to FIGS. 1A and 1B and the like.

Figure 1A:
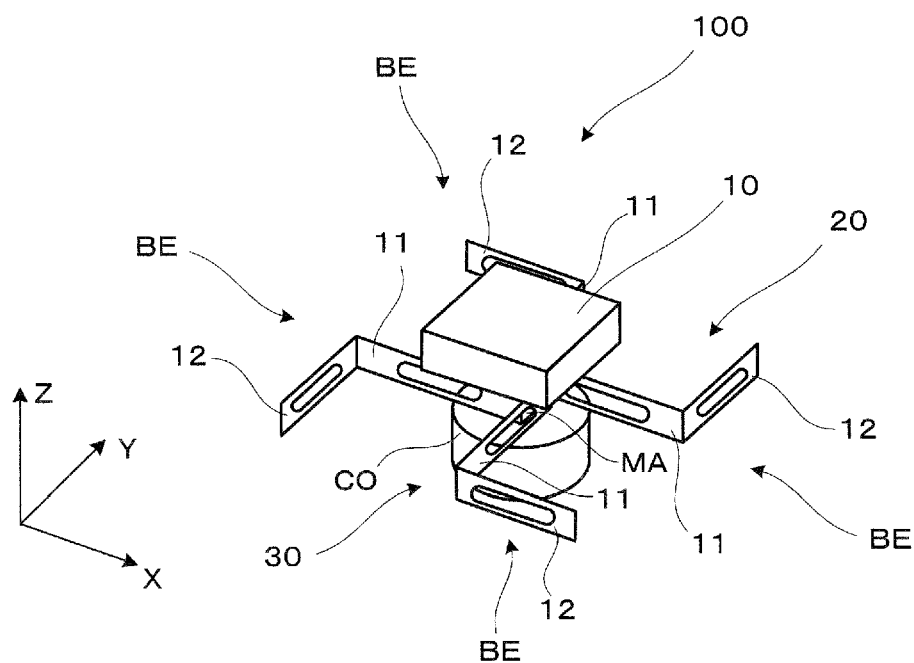
FIG. 1A is a perspective view for describing an actuator according to First Exemplary Embodiment.
Figure 1B:
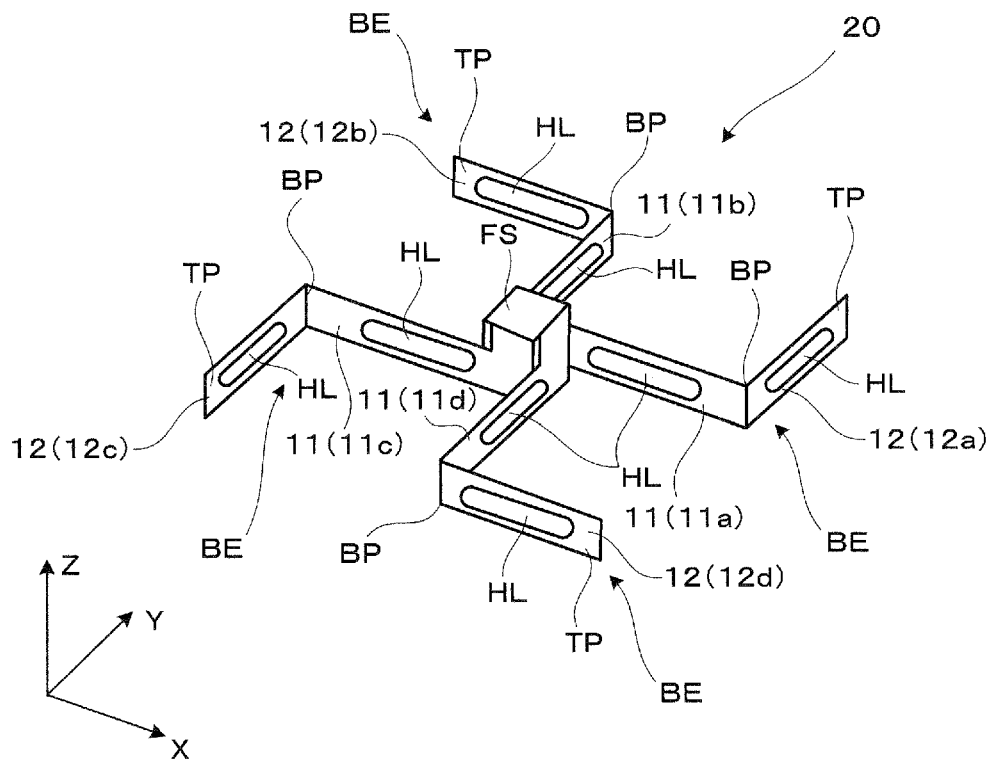
FIG. 1B is a perspective view for describing a beam structural portion constituting the actuator.

As illustrated in FIGS. 1A and 1B, an actuator 100 in First Exemplary Embodiment includes a movable portion 10, a beam structural portion 20 on which the movable portion 10 is mounted and fixed and which is configured to transmit vibration, and a driving portion 30 configured to drive the movable portion 10 via the beam structural portion 20.

First, in the actuator 100, the movable portion 10 is a member including a plane portion (rectangular surface portion in the drawing), and, for example, the movable portion 10 is a driven portion including an optical element such as a light diffusion plate attached to the plane portion, and being movable by being driven by the driving portion 30 and the like. It is assumed here that the plane portion of the movable portion 10 is a reference surface (horizontal surface), and, a direction (lateral direction) of one side of the reference surface of the movable portion 10 having a rectangular shape is an X direction, and a direction (longitudinal direction) of another side vertical to the X direction is a Y direction. Further, it is assumed that a direction vertical to both of the X direction and the Y direction, namely, a direction vertical to the reference surface is a Z direction. Furthermore, it is assumed that a direction parallel to an XY plane is an in-plane direction, and a direction vertical to the XY plane, namely, the Z direction is an out-of-plane direction. The movable portion 10 is movable in the in-plane direction by the beam structural portion 20 and the driving portion 30.

Furthermore, in the actuator 100, the beam structural portion 20 is a vibration member configured to support the movable portion 10 and to vibrate by being coupled to a part of the driving portion 30 to receive excitation force. In First Exemplary Embodiment, as illustrated in FIG. 1B, for example, the beam structural portion 20 is formed by bending a metallic member (member having sufficient resistance and elasticity such as copper) of one plate into a swastika shape. The beam structural portion 20 includes a fixed support portion FS as a central portion, a plurality of first beam portions 11, 11 . . . extending from the fixed support portion FS, and a plurality of second beam portions 12, 12 . . . provided corresponding to the plurality of first beam portions 11, 11 . . . , respectively. More specifically, in the illustrated example, the beam structural portion 20 includes four first beam portions 11a, 11b, 11c, and 11d extending in directions different from one another by 90° in the XY plane, namely, in the same plane and four second beam portions 12a, 12b, 12c, and 12d corresponding to the first beam portions 11a, 11b, 11c, and 11d. Note that the fixed support portion FS has a cuboid shape, and serves as a mounting stage portion on which the movable portion 10 is mounted and fixed and also as a housing portion in which a part of the driving portion 30 is housed and fixed.

Figure 2A:
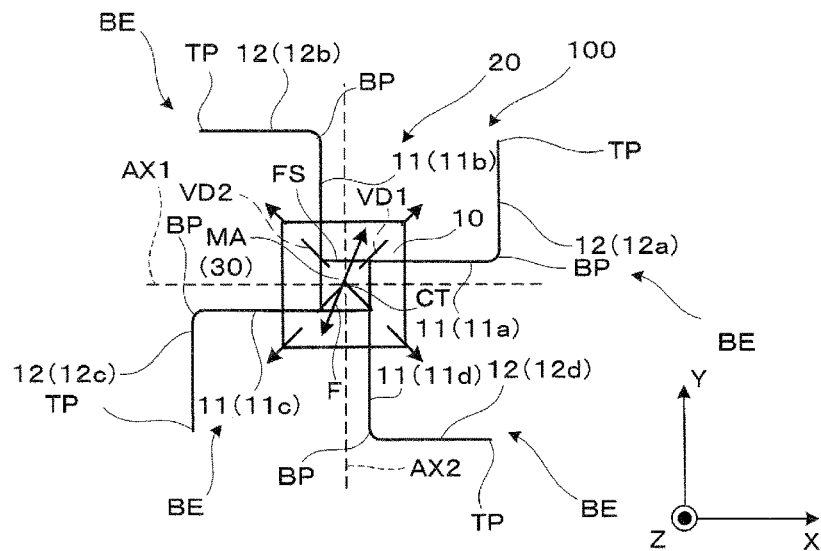
FIG. 2A is a plan view for schematically describing a structure of the beam structural portion.

Hereinafter, the first beam portion 11a and the second beam portion 12a in the beam structural portion 20 will be described with reference to FIGS. 1B, 2A, and the like. For example, as schematically illustrated in FIG. 2A, in the beam structural portion 20 on which the movable portion 10 is mounted, the first beam portion 11a extends in the +X direction from the central side, namely, the fixed support portion FS, and the second beam portion 12a is coupled to the first beam portion 11a and extends in the +Y direction (vertical direction) different from the direction in which the first beam portion 11a extends. The first beam portion 11a and the second beam portion 12a are formed by bending one plate member in the middle and providing a bent portion BP. Therefore, in other words, it is also conceivable that the first beam portion 11a and the second beam portion 12a are constituted by one beam BE provided with the bent portion BP in the middle. Furthermore, as illustrated in FIG. 1B, the first and second beam portions 11a and 12a or the one beam BE has a plate shape having a relatively large thickness in the out-of-plane direction (Z direction) and a relatively small thickness in the in-plane direction (direction parallel to the XY plane). Note that a "small thickness in the in-plane direction" here means a small width in a direction vertical to a direction of the in-plane direction in which the plate member extends. Namely, in the case illustrated, the first beam portion 11a has a small thickness in the Y direction, and the second beam portion 12a has a small thickness in the X direction. Further, the first and second beam portions 11a and 12a are each provided with a hole HL. On the other hand, the bent portion BP is provided with no hole. Further, a tip portion TP of the second beam portion 12a is fixed by a fixing portion (not illustrated). Hence, when force is applied to the first and second beam portions 11a and 12a (or the beam BE) from an oblique direction of the in-plane direction, a position of the tip portion TP remains fixed while the first beam portion 11a and the second beam portion 12a deform or an angle formed between the first beam portion 11a and the second beam portion 12a changes, and thus the first beam portion 11a and the second beam portion 12a function as springs.

Next, in the beam structural portion 20, the three sets of the first and second beam portions 11b, 11c, and 11d, and 12b, 12c, and 12d other than the first and second beam portions 11a and 12a also each have the same shape and structure as the shape and structure of the first and second beam portions 11a and 12a. Namely, the first beam portion 11b extends in the +Y direction from the fixed support portion FS, the second beam portion 12b is coupled to the first beam portion 11b and extends in the −X direction, and the first beam portion 11b and the second beam portion 12b constitute one beam BE provided with a bent portion BP in the middle. Furthermore, the first beam portion 11c extends in the −X direction from the fixed support portion FS, the second beam portion 12c is coupled to the first beam portion 11c and extends in the −Y direction, and the first beam portion 11c and the second beam portion 12c constitute one beam BE provided with a bent portion BP in the middle. Further, the first beam portion 11d extends in the −Y direction from the fixed support portion FS, the second beam portion 12d is coupled to the first beam portion 11d and extends in the +X direction, and the first beam portion 11d and the second beam portion 12d constitute one beam BE provided with a bent portion BP in the middle. Furthermore, the first and second beam portions 11b, 11c, and 11d, and 12b, 12c, and 12d similarly each include the hole HL.

As described above, the beam structural portion 20 has a shape to include the eight beam portions 11a, 11b, 11c, 11d, 12a, 12b, 12c, and 12d (or the four beams BE, BE, BE, and BE) expanding symmetrically in the same plane with the fixed support portion FS at the center. Further, more accurately, each of the first beam portions 11a, 11b, 11c, and 11d is disposed at a position slightly displaced from the central position of the beam structural portion 20 in the beam structural portion 20. Specifically, as illustrated in FIG. 2A, in comparison with central axes AX1 and AX2 extending in the X direction and the Y direction, respectively from a center CT of the fixed support portion FS as the central portion of the beam structural portion 20, each of the first beam portions 11a, 11b, 11c, and 11d extends from each side of the fixed support portion FS having a rectangular shape in a plan view and thus, each of the first beam portions 11a, 11b, 11c, and 11d extends in parallel with the central axes AX1 and AX2 from positions displaced (shifted) from the central axes AX1 and AX2 by a width of the fixed support portion FS. It is conceivable that when the beam structural portion 20 receives excitation force from the driving portion 30 owing to such displacement, the beam structural portion 20 becomes more likely to bend and ensures start of an operation. Furthermore, it is conceivable that in the beam structure 20, when a beam moves in a return direction, vibration of an adjacent beam is excited and thus, superimposed vibration is likely to be generated. When the beam structural portion 20 includes the structure as described above, two vibration modes always have superimposed vibration tracks, and thus a stopping moment generated by simple harmonic vibration such as reciprocating vibration can be eliminated. Further, joins of the first beam portions 11a, 11b, 11c, and 11d are displaced from the central axes AX1 and AX2, respectively and thus, vibration in an in-plane rotation direction is likely to be excited, and circular vibration can be realized efficiently without a loss of vibration. Furthermore, in this case, while vibration in the out-of-plane direction (Z direction) is suppressed, the in-plane vibration to be the circular vibration such as circle vibration can be generated. Thus, for example, when the beam structural portion 20 is installed in a projector, deviation of an optical path of light to be projected can be suppressed, and a speckle can also be reduced.

Figure 2B:
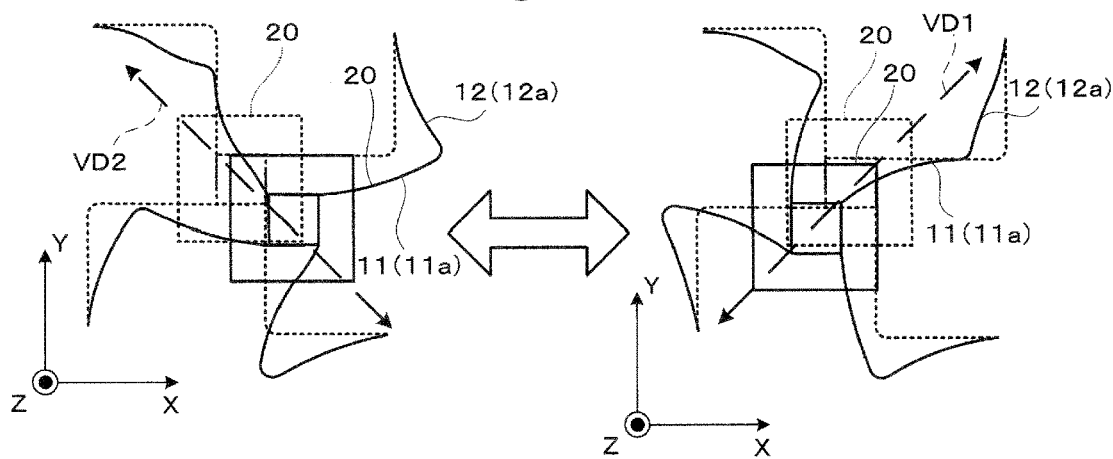
FIG. 2B is a plan view for describing a state of vibration of the beam structural portion illustrated in FIG. 2A.
Figure 2C:
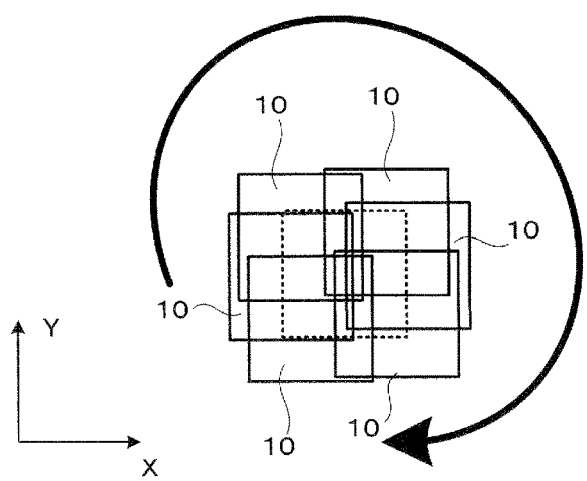
FIG. 2C is a view for schematically describing a state of movement of a movable portion.

When the beam structural portion 20 includes the structure as described above, the first and second beam portions 11a and 12a and the like being metallic (such as copper) plate members deform as illustrated in FIG. 2B, and function as spring members to move the movable portion 10 in the in-plane direction. Particularly, when the beam structural portion 20 has the shape as described above, the beam structural portion 20 includes a structure likely to vibrate in two different directions as illustrated in FIGS. 2A and 2B. In other words, natural frequencies in the vibration modes in the two different directions of the beam structural portion 20 are each lower than a frequency in any other vibration mode. Natural frequencies in the vibration modes in the two different directions in the structure is lower than a natural frequency in any other vibration mode. Namely, the beam structural portion 20 includes a structure likely to vibrate in the two directions of a first vibration direction VD1 in which vibration occurs in a direction at an angle of elevation of 45° to the +X direction and a second vibration direction VD2 in which vibration occurs in a direction at an angle of elevation of 45° to the −X direction in the XY plane. Thus, as illustrated in FIG. 2C, the movable portion 10 attached to the fixed support portion FS can make motion to turn in the in-plane direction.

With reference to FIG. 1A and the like again, in the actuator 100, the driving portion 30 includes one (a pair of) driving mechanism including one permanent magnet MA and one coil CO. Namely, an AC current is caused to flow at a predetermined driving frequency as a driving current through the coil CO, and thus the beam structural portion 20 is excited by using Lorentz force generated between the permanent magnet MA and the coil CO to drive the movable portion 10. In the illustrated example, the permanent magnet MA is housed in the fixed support portion FS provided in the beam structural portion 20, whereas the coil CO is disposed directly below (on the −Z side of) the fixed support portion FS and fixed. Namely, the permanent magnet MA of the driving portion 30 serves as a beam portion side-driving element attached to the beam structural portion 20, and the permanent magnet MA is driven by a current flowing through the coil CO. However, this is an example, and a configuration other than the above-described configuration may be adopted as long as excitation in a suitable direction described below can be achieved.

Hereinafter, an operation of the actuator 100 in First Exemplary Embodiment will be described with reference to FIGS. 2A, 2B, and 2C and the like.

First, as illustrated in FIG. 2A, the driving portion 30 exerts excitation force F on the beam structural portion 20 in First Exemplary Embodiment. Here, at the time of startup, the excitation force F is exerted in a direction different from any of the two vibration directions VD1 and VD2 defined by the beam structural portion 20. Namely, to achieve such a direction, a direction of a magnetic field of the permanent magnet MA and a direction of a current of the coil CO constituting the driving portion 30 are adjusted. Further, the direction of the excitation force F is different from a direction in which each of the beam portions 11a and the like extends. Namely, the direction of the excitation force F is assumed to be a direction not parallel with any of the X direction and the Y direction. Furthermore, an AC current at a predetermined driving frequency flows through the driving portion 30, and thus the magnitude of the AC current changes with a change in a driving current including the case of positive and negative current.

On the other hand, the beam structural portion 20 to which the permanent magnet MA is attached receives the excitation force F as described above from the permanent magnet MA, and components in directions along the two vibration directions VD1 and VD2 of the excitation force F start to vibrate. In this case, the direction of the excitation force F is different from any of the two vibration directions VD1 and VD2, and thus the excitation force F is exerted in both of the two vibration directions VD1 and VD2. Furthermore, the direction of the excitation force F changes with a change in a direction of a current and a position of the permanent magnet during vibration, and the excitation force F is also exerted in the two vibration directions VD1 and VD2 in this case. Therefore, although the excitation force F is exerted in one direction in a certain period of time, the beam structural portion 20 as a whole makes movement to vibrate in the two different directions. The beam structural portion 20 makes the movement of a combination of the vibration in the two directions and thus, the beam structural portion 20 as a whole operates in, for example, a circle as schematically illustrated in FIG. 2C. Here, particularly, the beam structural portion 20 moves in a circle or an ellipse. Namely, the movable portion 10 is caused to undergo curvilinear motion maintaining movement in at least one of the two vibration directions VD1 and VD2 without a velocity component of zero in any of the vibration directions, namely, without stopping at any moment. Accordingly, there is no place where a velocity component becomes zero, and thus, for example, when a light diffusion plate is attached to the movable portion 10 and disposed on an optical path of laser light, a speckle of the laser light is visually recognized at a moment at which the velocity component becomes zero, but occurrence of such a situation can be reduced.

Here, to generate vibration in both of the two vibration directions VD1 and VD2 with the excitation force F exerted in one direction in a certain period of time by the driving portion 30 as the one (the pair of) driving mechanism as described above, the two vibration directions VD1 and VD2 ideally have an identical resonant mode (vibration mode) and a resonant frequency (natural frequency) in the identical resonant mode identical to a driving frequency of the driving portion 30. In this case, the driving portion 10 can be driven with very high efficiency by resonance and vibration. Therefore, first, in this case, two resonant modes corresponding to the two vibration directions VD1 and VD2, respectively are provided, and the resonant modes are set to be identical. In First Exemplary Embodiment, the two resonant modes are defined by shapes, disposition, weights, and the like of the movable portion 10, the beam structural portion 20, and the permanent magnet MA serving as a beam portion side-driving element incorporated in the driving portion 30 and attached to the beam structural portion 20. It is particularly conceivable that the two resonant modes can be set to be substantially identical by providing structural symmetry.

Furthermore, it is conceivable that in the resonant modes, a region having a high gain may be distributed in the range having a frequency higher than a certain degree to avoid influence of other unintentional vibration (ambient vibration). This is because, for example, vibration at a frequency around 60 Hz may be transmitted through various surroundings. Furthermore, it is conceivable that, for example, from a viewpoint of attaching the light diffusion plate to be used for reducing a speckle, vibration at a frequency of greater than or equal to 30 Hz may be generated to achieve such a function of the light diffusion plate. On the other hand, when a frequency is too high, driving force (excitation force) to generate vibration also increases. From the above-described viewpoint, the two resonant modes may be set to be substantially identical with a value of approximately 120 Hz as a peak, for example. Note that, various methods for such adjustment are conceivable, and it is conceivable that, for example, the first beam portion 11a and the like are each provided with the hole HL as described above.

Figure 3:
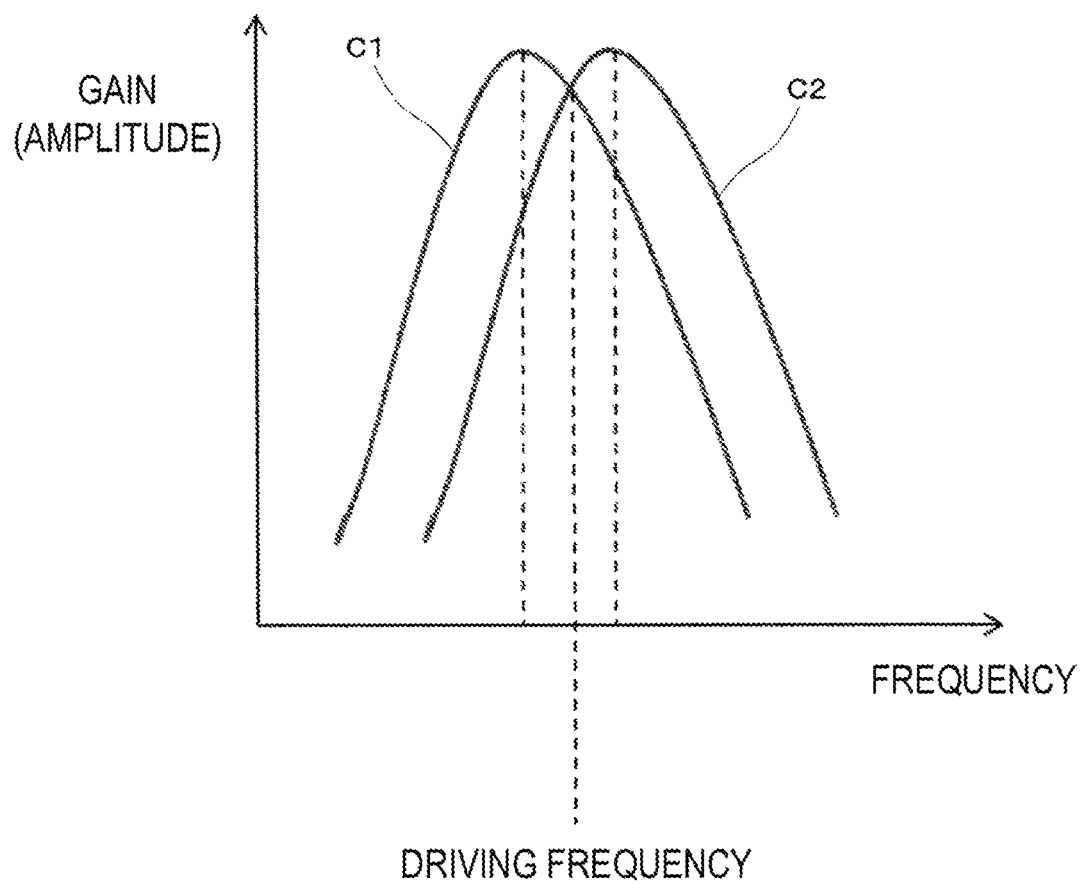
FIG. 3 is a graph illustrating a relationship between two resonant modes corresponding to two vibration directions and a driving frequency.

However, in an actual device, even when the adjustment and the like as described above are made, the two resonant modes may still be different owing to a manufacturing error and the like, as exemplified in FIG. 3. Here, the two resonant modes corresponding to the two vibration directions and a driving frequency will be examined with reference to a graph and the like illustrated in FIG. 3.

First, as described above, curved lines C1 and C2 indicating the two resonant modes illustrated in FIG. 3 are slightly different from each other. Note that, it is assumed that the horizontal axis is a frequency and the vertical axis is a gain (corresponding to efficiency, or an amplitude of the movable portion 10) in FIG. 3. Namely, a frequency corresponding to a peak of a gain indicated by each of the curved lines C1 and C2 is a resonant frequency (natural frequency) of a resonant mode enabling the most efficient vibration. In First Exemplary Embodiment, a frequency within the range in which gains of the resonant frequencies corresponding to the two resonant modes overlap each other is set to be a driving frequency (the highest place in the range in which the gains overlap each other around the middle of the peaks of the curved lines C1 and C2 in the illustrated example) and thus, appropriate driving can be ensured.

Figure 4A:
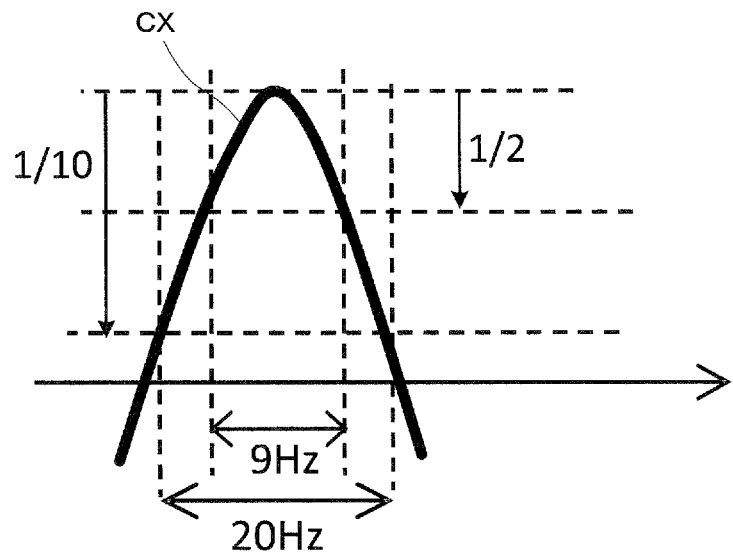
FIG. 4A is a view for describing the allowable range of an amount of deviation between the resonant modes and the allowable range of the driving frequency.
Figure 4B:
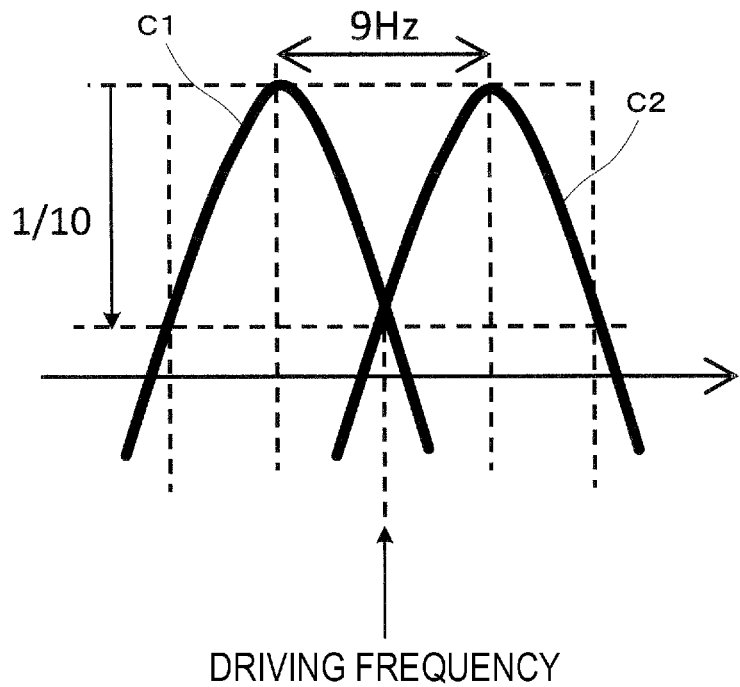
FIG. 4B is a view for describing the allowable range of an amount of deviation between the resonant modes and the allowable range of the driving frequency.

Hereinafter, the allowable range of an amount of deviation between the two resonant modes and the allowable range of the driving frequency will further be examined with reference to FIGS. 4A and 4B. FIG. 4A is a view for examining the allowable range of the driving frequency when the two resonant modes are identical (identical at 120 Hz, for example). In this case, assuming that the usable range is set up to the range in which a value of a gain (amplitude) of a curved line CX indicating the identical resonant mode is ½ (half), the allowable range of the driving frequency with the resonant frequency (natural frequency) of the resonant mode as the center is within a width of approximately 9 Hz. Further, assuming that the usable range is set up to the range in which a value of a gain (amplitude) is 1/10, the allowable range of the driving frequency is within a width of approximately 20 Hz. On the other hand, FIG. 4B is a view for examining the allowable range of an amount of deviation when the two resonant modes are not identical (when the two resonant modes are deviated from 120 Hz as a reference, for example). In this case, it is conceivable that an allowable amount of deviation is approximately 9 Hz. This is because when an amount of the deviation is approximately 9 Hz, a value at which gains (amplitudes) in both of the resonant modes are maximum is 1/10 of the case of a peak in each of the resonant modes and thus, there is no more efficient driving frequency to be selected.

It is conceivable from the above-described examination that any of the allowable range of an amount of deviation between the two resonant modes and the allowable range of the driving frequency may be within several Hz at most.

As described above, in First Exemplary Embodiment, movement of the movable portion 10 without stopping at any moment can be achieved by the simple configuration including the beam structural portion 20 including the two beam portions 11a and 12a and the like extending in the directions different from each other and the one driving portion 30. Furthermore, in this case, a size reduction of a device can be achieved in comparison with a case where a device includes a motor disposed for rotation driving, for example.

Note that, as described above, from a viewpoint of attaching the light diffusion plate to be used for reducing a speckle, motion in the out-of-plane direction (Z direction), namely, vibration in the out-of-plane direction (out-of-plane vibration) may further be suppressed as much as possible. To suppress the out-of-plane vibration as much as possible, a resonant mode having the out-of-plane direction (Z direction) as a vibration direction may be different from the above-described two resonant modes. Namely, resonant frequencies (natural frequencies) of the resonant modes are ideally greatly different. Particularly, a resonant frequency (natural frequency) of the resonant mode having the out-of-plane direction (Z direction) as the vibration direction is ideally high. In contrast, in First Exemplary Embodiment, a thickness of the first and second beam portions (a thickness of the one beam) is set to be relatively large in the out-of-plane direction (Z direction) and relatively small in the in-plane direction (direction parallel to the XY plane) and thus, the out-of-plane vibration is suppressed as much as possible.

Second Exemplary Embodiment

Hereinafter, an actuator according to Second Exemplary Embodiment will be described with reference to FIGS. 5A and 5B and the like. Second Exemplary Embodiment is a modification of First Exemplary Embodiment. The actuator according to Second Exemplary Embodiment is the same as the actuator according to First Exemplary Embodiment, except for a structure of a beam structural portion and disposition of a driving portion, and thus the same reference signs are assigned to members having the same functions, and detailed description of each portion will be omitted.

Figure 5A:
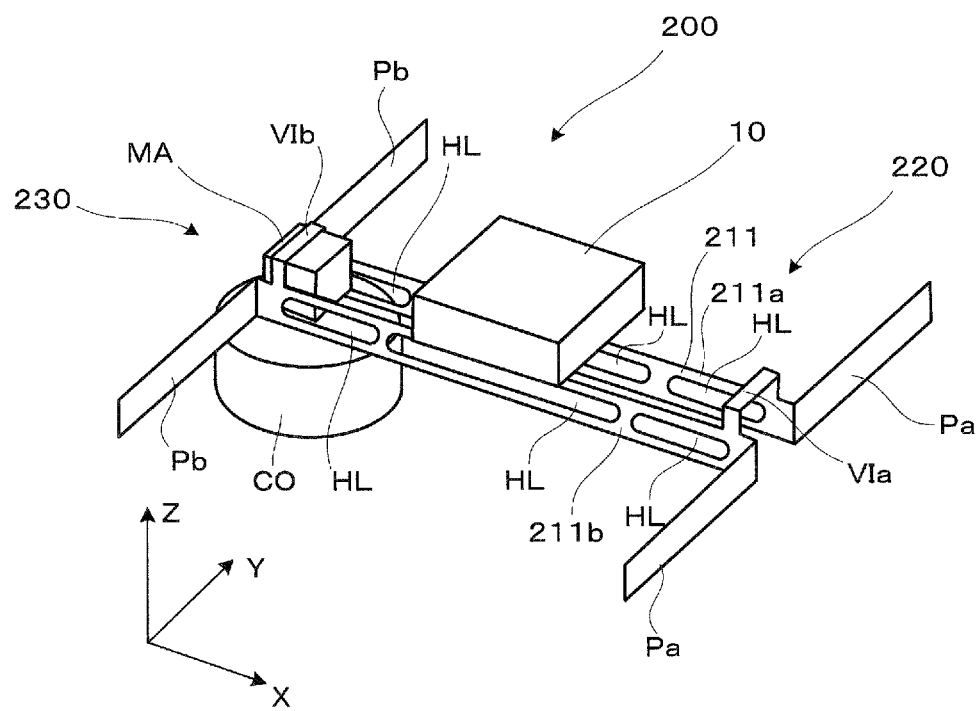
FIG. 5A is a perspective view for describing an actuator according to Second Exemplary Embodiment.
Figure 5B:
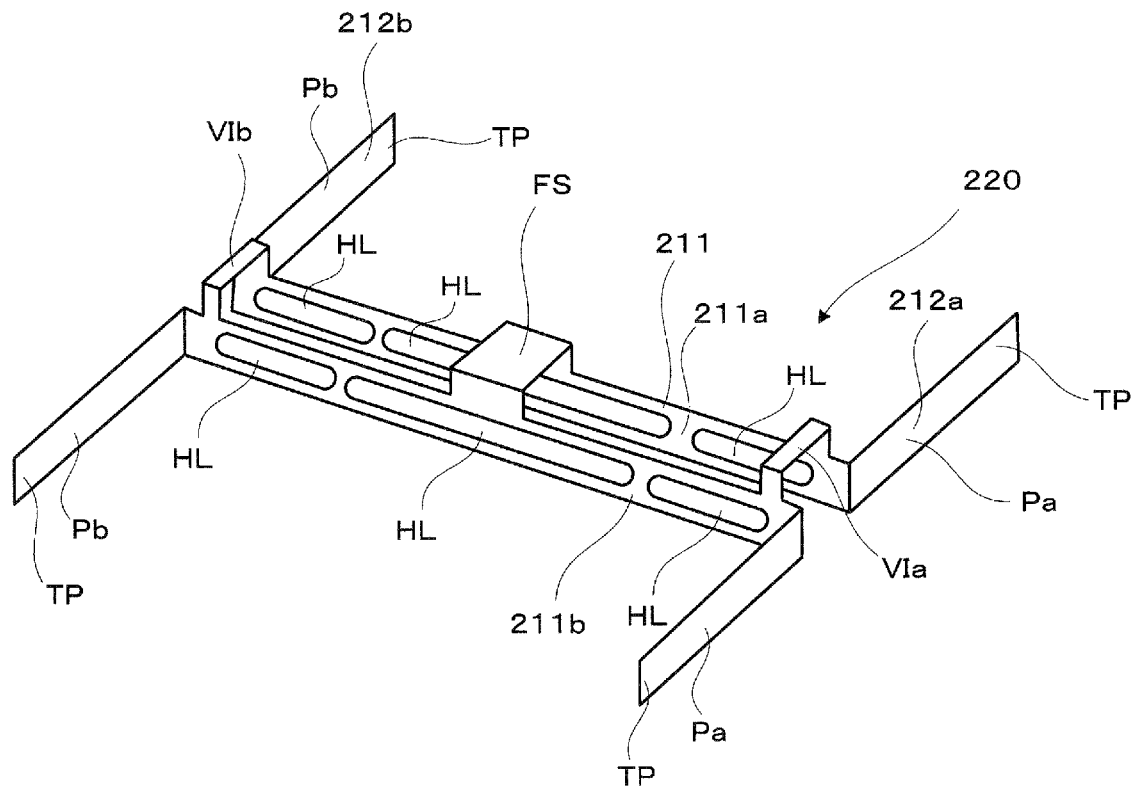
FIG. 5B is a perspective view for describing a beam structural portion constituting the actuator.

As illustrated in FIGS. 5A and 5B, an actuator 200 according to Second Exemplary Embodiment includes a movable portion 10, a beam structural portion 220 on which the movable portion 10 is mounted and fixed and which is configured to transmit vibration, and a driving portion 230 configured to drive the movable portion 10 via the beam structural portion 220.

Hereinafter, a structure of the beam structural portion 220 in the actuator 200 will be described with reference to FIG. 5B and the like. The beam structural portion 220 is formed by bending a metallic member (member having sufficient resistance and elasticity such as copper) of one plate into an H shape. The beam structural portion 220 includes a fixed support portion FS as a central portion on which the movable portion 10 is mounted, a first beam portion 211 extending to left and right in the X direction (lateral direction) with the fixed support portion FS as the center, a pair of second beam portions 212a and 212b provided at both ends of the first beam portion 211 and each extending up and down in the Y direction (longitudinal direction), and a pair of vibration separating portions VIa and VIb provided at coupling places at which the first beam portion 211 intersects the second beam portions 212a and 212b and configured to separate vibration into two directions.

In the beam structural portion 220, the first beam portion 211 constitutes an inner beam disposed on a side relatively close to the movable portion 10 and includes two plate members 211a and 211b disposed to be spaced apart from each other and extending in parallel with the X direction as a direction in which the two plate members 211a and 211b extend. The plate members 211a and 211b are each provided with a hole HL.

The pair of second beam portions 212a and 212b constitute outer beams disposed at ends on an +X side and an −X side of the first beam portion 211, respectively and each include two plate members extending in the Y direction via the vibration separating portions VIa and VIb provided corresponding to the pair of second beam portions 212a and 212b, respectively. For example, as for a second beam portion 212a disposed on the +X side, two plate members Pa and Pa extending in the Y direction are connected to each other via the vibration separating portion VIa having a U shape to constitute the one second beam portion 212a. Similarly, as for a second beam portion 212b, two plate members Pb and Pb extending in the Y direction are connected to each other via the vibration separating portion VIb having a U shape to constitute the one second beam portion 212b. Note that tip portions TP of the second beam portions 212a and 212b are each fixed by a fixing portion (not illustrated).

The pair of vibration separating portions VIa and VIb serve as U-shaped coupling places made when a metallic member of one plate is bent to form the beam structural portion 220. As described below with reference to FIGS. 6A and 6B, in Second Exemplary Embodiment, the vibration separating portions VIa and VIb each have a function to separate vibration by the first beam portion 211 and vibration by the second beam portions 212a and 212b. Furthermore, here, the vibration separating portion VIb also functions as a housing portion in which a part of the driving portion 230 is housed and fixed (see FIG. 5A).

Hereinafter, with reference to FIG. 5A again, the driving portion 230 in the actuator 200 will be described. As with the driving portion 30 (see FIG. 1A) in First Exemplary Embodiment, the driving portion 230 includes one (a pair of) driving mechanism including one permanent magnet MA and one coil CO. Namely, an AC current is caused to flow as a driving current through the coil CO, and thus the beam structural portion 220 is excited by using Lorentz force generated between the permanent magnet MA and the coil CO to drive the movable portion 10. In the illustrated example, the permanent magnet MA is housed in the vibration separating portion VIb provided in the beam structural portion 220, whereas the coil CO is disposed directly below (on the −Z side of) the vibration separating portion VIb and fixed. Namely, the permanent magnet MA of the driving portion 230 serves as a beam portion side-driving element attached to the beam structural portion 220, and the permanent magnet MA is driven in accordance with a change in the current flowing through the coil CO. However, this is an example, and a configuration other than the above-described configuration may be used as long as excitation in a suitable direction described below can be achieved. Here, it is assumed as an example that, at the time of startup, a direction of a magnetic field of the permanent magnet MA and a direction of a current of the coil CO are adjusted for the driving portion 30 to exert excitation force on the beam structural portion 220 at an angle of elevation of 45° to the +X direction.

In the configuration described above, as illustrated in FIG. 6A, the first beam portion 211 vibrates in the Y direction as a first vibration direction VD1. On the other hand, as illustrated in FIG. 6B, the second beam portions 212a and 212b vibrate in the X direction as a second vibration direction VD2. Furthermore, in this case, the pair of vibration separating portions VIa and VIb function as a reference for separating vibration in the first vibration direction VD1 from vibration in the second vibration direction VD2.

Figure 6A:
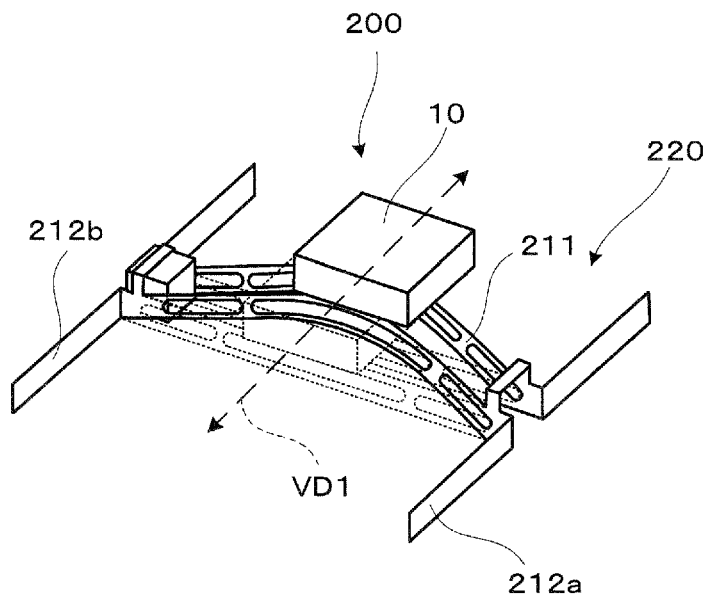
FIG. 6A is a perspective view illustrating a state of vibration in a first vibration direction by a first beam portion.
Figure 6B:
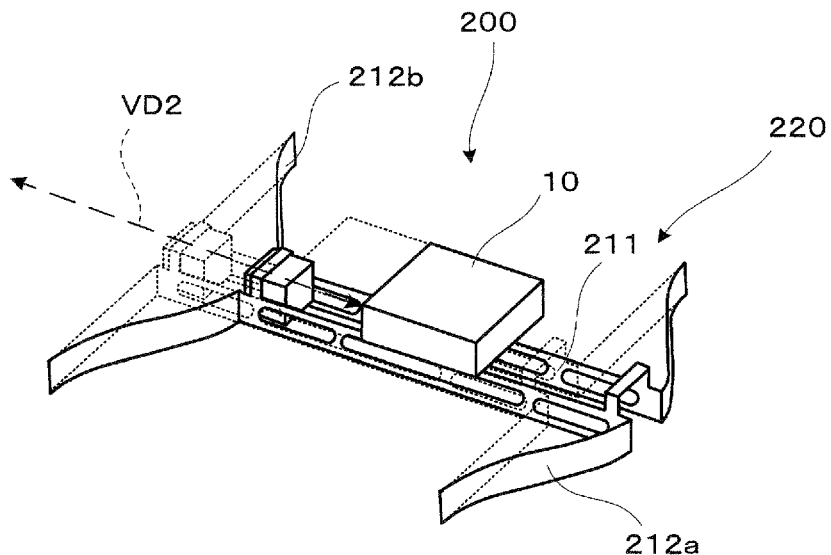
FIG. 6B is a perspective view illustrating a state of vibration in a second vibration direction by a second beam portion.

Furthermore, in this case, as clearly seen from comparison between FIGS. 6A and 6B, the first beam portion 211 constituting the inner beam directly vibrates the movable portion 10, whereas the second beam portions 212a and 212b constituting the outer beams vibrate the first beam portion 211 on which the movable portion 10 is mounted. Thus, driving by the driving portion 230 is appropriately adjusted, and thus complex vibration generating curvilinear motion (for example, motion such as circle motion) maintaining movement in at least one of the two vibration directions VD1 and VD2 can be generated. Furthermore, in this case, the vibration in the two directions is separated via the vibration separating portions VIa and VIb from the beams configured to generate the vibration in the two directions. Hence, the vibration in the two directions can be examined separately and individually. In this case, it is clear that a weight of an object to be vibrated by the first beam portion 211 constituting the inner beam is different from a weight of an object to be vibrated by the second beam portions 212a and 212b constituting the outer beams. Namely, an object to be moved by the second beam portions 212a and 212b constituting the outer beams has a greater size and a greater weight. On the other hand, as with First Exemplary Embodiment, the driving portion 230 includes the one (the pair of) driving mechanism, and thus the driving portion 230 operates at one driving frequency, and both resonant modes are set to be identical. Thus, in Second Exemplary Embodiment, the first beam portion 211 constituting the inner beam is provided with the hole HL to change a spring constant of the first beam portion 211, and thus a resonant frequency in a vibration direction can be adjusted.

As described above, also in Second Exemplary Embodiment, movement of the movable portion 10 without stopping at any moment can be achieved by the simple configuration including the beam structural portion 220 including the first beam portion 211, the second beam portions 212a and 212b, and the like extending in the directions different from each other, and the one driving portion 230. Furthermore, in this case, a size reduction of a device can be achieved in comparison with a case where a device includes a motor disposed for rotation driving, for example.

Furthermore, in Second Exemplary Embodiment, the allowable range of the driving frequency examined as with the case in First Exemplary Embodiment is within a width of approximately 4 Hz with the usable range being up to the range in which a gain (amplitude) is ½ (half), and within a width of approximately 20 Hz with the usable range being up to the range in which a gain is ¹/₁₀. The allowable range of an amount of deviation between the two resonant modes is approximately 4 Hz. Therefore, it is conceivable that any of the allowable range of an amount of deviation between the two resonant modes and the allowable range of the driving frequency may be within several Hz at most.

Third Exemplary Embodiment

Hereinafter, an optical device in which the above-described actuator is installed and a projector according to Third Exemplary Embodiment will be described with reference to FIG. 7. Here, an optical device 900 in which the actuator 100 exemplified in First Exemplary Embodiment is installed is exemplified, but another actuator may be installed.

Figure 7:
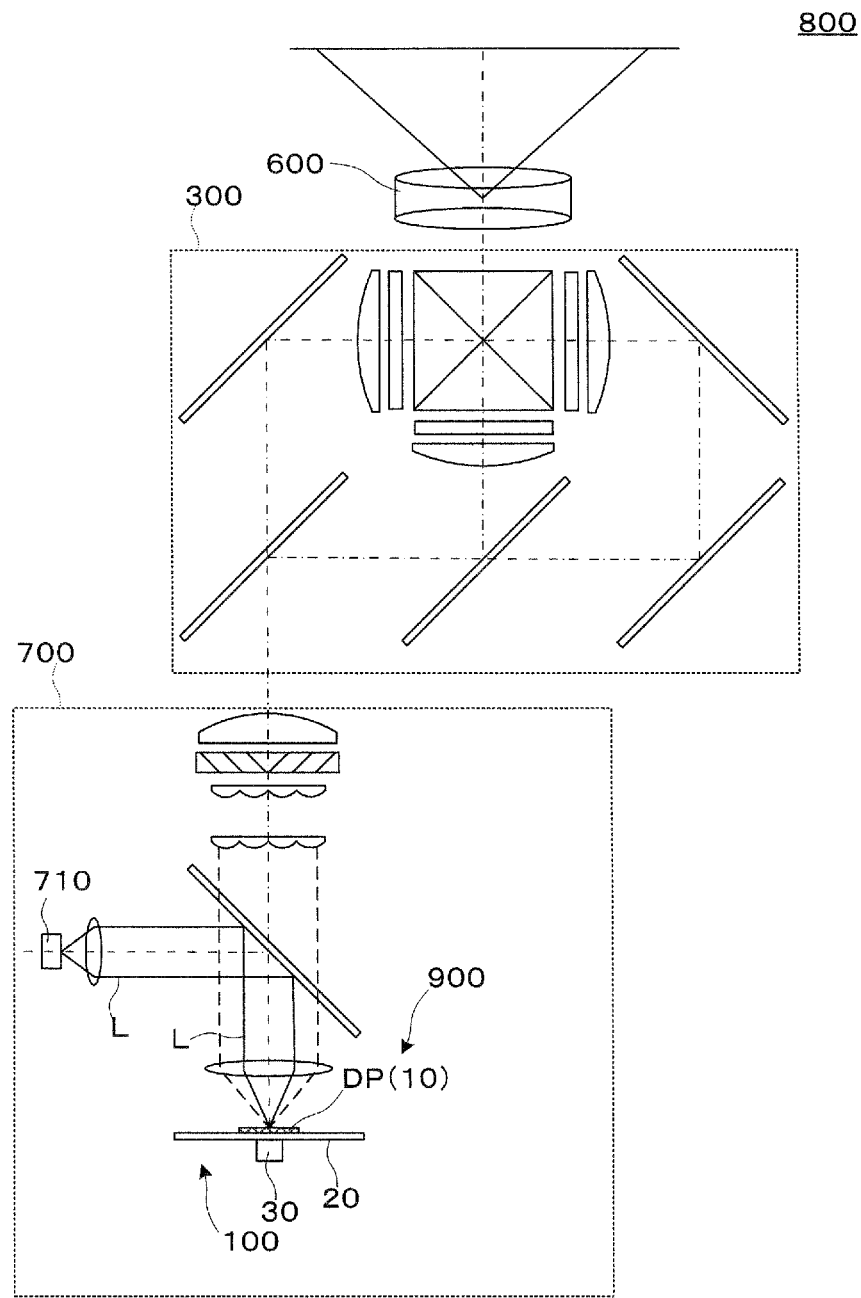
FIG. 7 is a plan view for describing an optical device and a projector according to Third Exemplary Embodiment.

A projector 800 illustrated in FIG. 7 includes a light source device 700 configured to eject laser light, an image formation optical system 300, and a projection optical system 600.

The light source device 700 includes a light source 710 and the like in addition to the optical device 900 in which the actuator 100 is installed.

Here, the optical device 900 in Third Exemplary Embodiment is a device including a light diffusion plate DP as an optical element at a place of the movable portion 10 of the actuator 100 configured to cause the light diffusion plate DP to make curvilinear motion and to appropriately disturb and reflect a phase of incident laser light to reduce a speckle. The light diffusion plate DP includes irregularities formed on a surface of, for example, an aluminum plate, and further includes a dielectric multilayer film, a metallic reflection film, and the like formed on the surface.

The light source device 710 emits laser light L of three colors of RGB. The ejected laser light L is emitted toward the optical device 900 of a reflection type via a collimating lens, a light separating element, and the like. The laser light L is appropriately diffused and reflected by the light diffusion plate DP of the optical device 900. At this time, a phase of the laser light is moderately disturbed. The laser light L in such a state is further emitted toward the image formation optical system 300 via an illumination optical system including a lens array, a polarization converting element, a superimposed lens, and the like. Further, the laser light L is color-separated and light-guided by a dichroic mirror, a reflection mirror, and the like constituting the image formation optical system 300, and is light-modulated by a liquid crystal light modulation device provided for each color, and the laser light L is further combined by a cross dichroic prism. The combined components are projected onto the projection optical system 600. Thus, the projector 800 performs image projection.

In Third Exemplary Embodiment, the optical device 900 includes the actuator 100, and the projector 800 includes the optical device 900. Thus, movement of the light diffusion plate DP without stopping at any moment can be achieved in the optical device. Furthermore, a size reduction of a device can be achieved in comparison with a case where a device includes a motor disposed for rotation driving, for example. Furthermore, the projector 800 can also perform excellent image display in which a speckle due to the laser light L is reduced.

OTHERS

The disclosure is not limited to each exemplary embodiment described above. The embodiment can be implemented in various aspects without departing from the gist of the embodiment.

First, the control of a current and the direction of a magnetic field illustrated in each exemplary embodiment are examples in the description above, and the control of a current, the direction of a magnetic field, the shape and disposition of each portion, and the like can be modified appropriately. For example, it is conceivable to dispose a coil in a lateral direction. Furthermore, a permanent magnet and a coil may be switched between each other.

Furthermore, in First Exemplary Embodiment, four beams are provided, but five or more beams may be provided.

Figure 8:
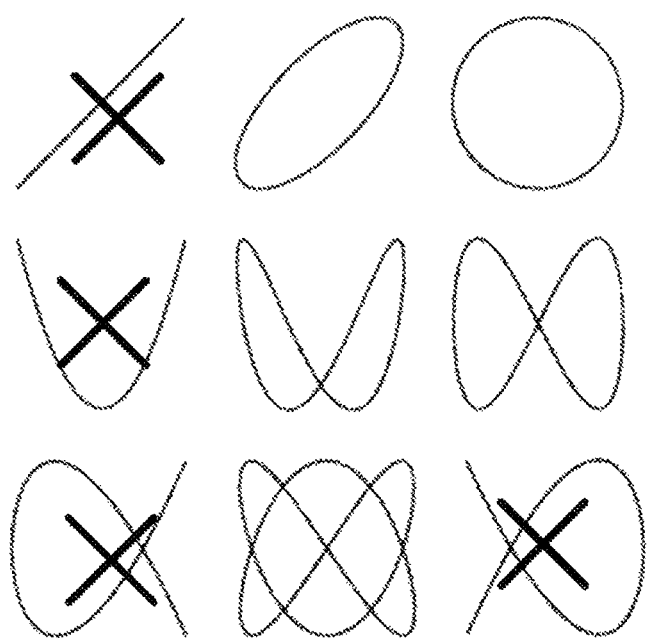
FIG. 8 is a view for exemplifying a track of motion by in-plane vibration.

Furthermore, in the description above, the circular or elliptical track is described as an example of the curvilinear motion maintaining movement in at least one of the two vibration directions VD1 and VD2 without a velocity component of zero in any of the vibration directions during vibration. However, the embodiment is not limited to this, and various types of curvilinear motion are conceivable. For example, a phase difference between the two vibration directions may be provided to draw a track such as a Lissajous's figure. However, from a viewpoint of making curvilinear motion without a velocity component of zero, namely, without stopping at any moment, a Lissajous's figure as exemplified in FIG. 8 in which a line of a track stops and turns back (X sign in FIG. 8) is not selected.

The entire disclosure of Japanese Patent Application No. 2017-208894, filed Oct. 30, 2017 is expressly incorporated by reference herein.

What is claimed is:

1. An actuator comprising:
a movable portion;
a beam structural portion including a first beam portion coupled to the movable portion and a second beam portion coupled to the first beam portion and extending in a direction different from a direction of the first beam portion; and
a driving portion including one driving mechanism and configured to excite the movable portion in two vibration directions defined based on the beam structural portion to cause the movable portion to make curvilinear motion maintaining movement in at least one of the two vibration directions, wherein two resonant modes corresponding to the two vibration directions are provided,
the driving portion operates at a driving frequency corresponding to the two resonant modes and causes the movable portion to resonate and vibrate, and
the driving frequency includes a frequency within the range in which gains of resonant frequencies corresponding to the two resonant modes overlap each other.

2. The actuator according to claim 1, wherein
the two resonant modes are defined by the movable portion, the beam structural portion, and a beam portion side-driving element incorporated in the driving portion and attached to the beam structural portion.

3. The actuator according to claim 1, wherein
the two resonant modes are different from a resonant mode in an out-of-plane direction vertical to an in-plane direction of a plane parallel with directions in which the first and second beam portions extend.

4. The actuator according to claim 1, wherein
the beam structural portion includes a plurality of the first beam portions extending in directions different from one another and a plurality of the second beam portions provided corresponding to the plurality of first beam portions, respectively.

5. The actuator according to claim 4, wherein
the beam structural portion includes four first beam portions extending in directions different from one another by 90° in the same plane and four second beam portions provided corresponding to the four first beam portions, respectively.

6. The actuator according to claim 4, wherein
the plurality of first beam portions are disposed at positions displaced from a central position in the beam structural portion.

7. The actuator according to claim 1, wherein
the first beam portion constitutes an inner beam extending in a first direction and including the movable portion mounted at the center, and
the second beam portion constitutes a pair of outer beams provided at both ends of the first beam portion and extending in a second direction.

8. The actuator according to claim 7, wherein
the first beam portion vibrates in one of the two vibration directions, and the second beam portion vibrates in the other of the two vibration directions.

9. The actuator according to claim 7, wherein
the first beam portion constituting the inner beam includes a hole.

10. The actuator according to claim 7, further comprising:
a vibration separating portion provided at a coupling place where the first beam portion intersects the second beam portion and configured to separate vibration.

11. An optical device comprising:
the actuator according to claim 1; and
an optical element provided in the movable portion and configured to undergo the curvilinear motion.

12. The optical device according to claim 11, wherein
the optical element includes a light diffusion plate.

13. A projector comprising:
the optical device according to claim 11, wherein
the projector is configured to perform image projection with laser light reflected by the optical device.

14. An actuator comprising:
a movable portion;
a beam structural portion including a first beam portion coupled to the movable portion and a second beam portion coupled to the first beam portion and extending in a direction different from a direction of the first beam portion; and a driving portion including one driving mechanism and configured to excite the movable portion in two vibration directions defined based on the beam structural portion to cause the movable portion to make curvilinear motion maintaining movement in at least one of the two vibration directions, wherein the beam structural portion includes a plurality of the first beam portions extending in directions different from one another and a plurality of the second beam portions provided corresponding to the plurality of first beam portions, respectively.

15. An actuator comprising:

a movable portion;

a beam structural portion including a first beam portion coupled to the movable portion and a second beam portion coupled to the first beam portion and extending in a direction different from a direction of the first beam portion; and a driving portion including one driving mechanism and configured to excite the movable portion in two vibration directions defined based on the beam structural portion to cause the movable portion to make curvilinear motion maintaining movement in at least one of the two vibration directions, wherein two resonant modes corresponding to the two vibration directions are provided, and the two resonant modes are different from a resonant mode in an out-of-plane direction vertical to an in-plane direction of a plane parallel with directions in which the first and second beam portions extend.

* * * * *